Patented Aug. 31, 1937

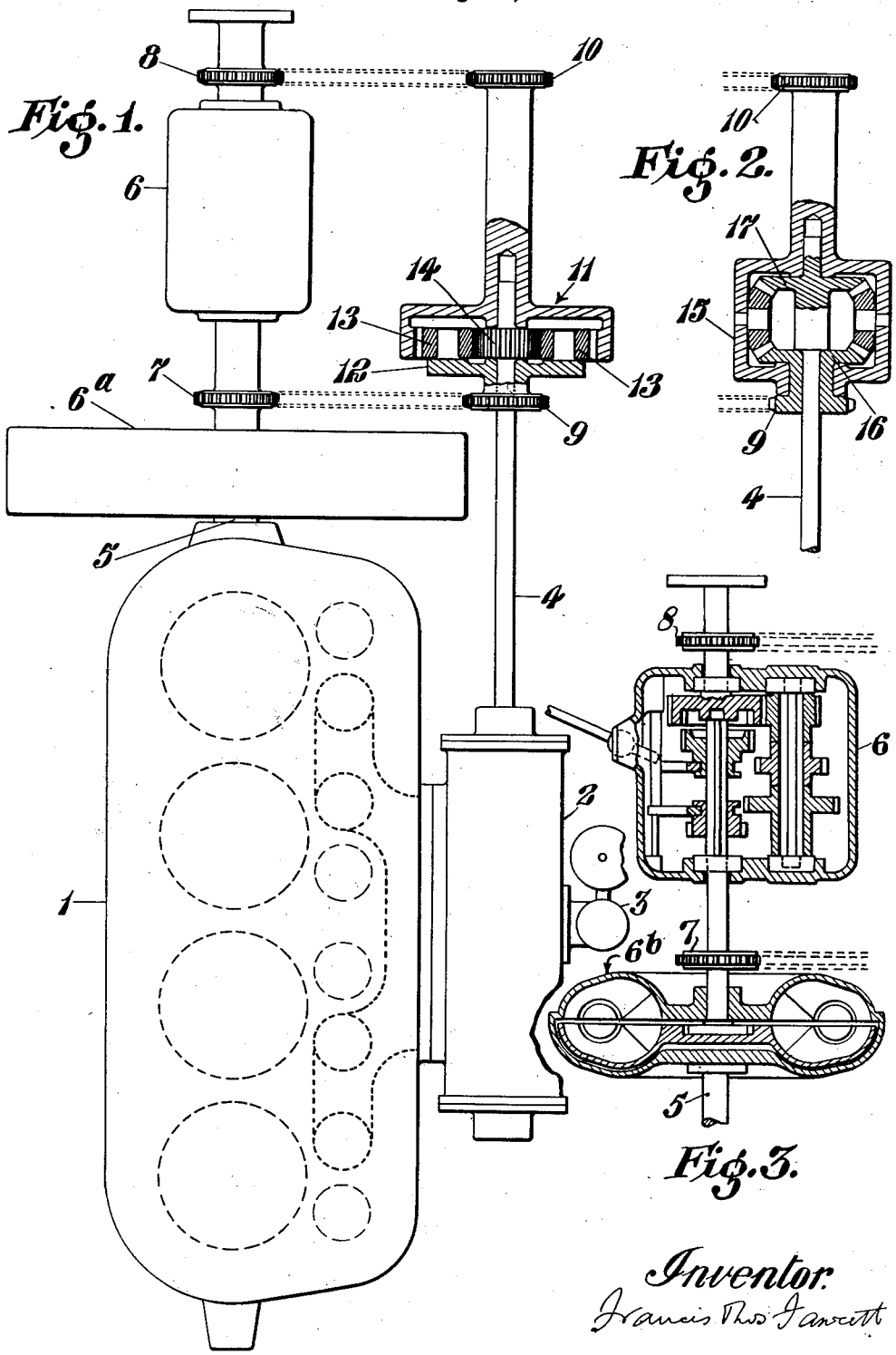

2,091,356

UNITED STATES PATENT OFFICE 2,091,356

DRIVING OF SUPERCHARGERS OF INTERNAL COMBUSTION ENGINES

Francis Thomas Fawcett, Woodford, England

Application August 28, 1935, Serial No. 38,227
In Great Britain August 31, 1934

9 Claims. (Cl. 123—119)

This invention relates to power transmission systems for use with internal combustion engines having superchargers associated therewith, and especially, although not exclusively, for automobile road or other vehicles.

According to the present day, and generally accepted practice with supercharged internal combustion engines the degree of supercharge is too great at high engine revolutions and too small at low speeds (where it is really required) owing to the fact that the supercharger or like blower is driven by the engine and consequently the amount of charge compressed is directly proportional to the engine revolutions.

According to the present invention a power transmission system, wherein an internal combustion engine provided with a supercharger drives an output shaft, comprises means for driving said supercharger and means for varying the speed of said supercharger in accordance with the difference in speed between the engine and output shaft.

By this arrangement, the supercharger can be run at a relatively high rate, when the need for the supercharger is great, that is to say when the engine should develop a high power, such as for starting or for acceleration.

The transmission system may include a clutch and/or a variable-speed transmission mechanism and it will be understood that in such event during the time of acceleration, when the engine is running at a higher speed than the output shaft, the arrangement is such that the supercharger is operated at a high speed while as the speed of the output shaft increases so as to approach the speed of the engine shaft, the supercharger is slowed down.

A power transmission system according to the present invention may be provided with a clutch of any suitable type such as a fluid clutch of the Föttinger type, and it may, in addition, be combined with a change-speed gear of the sliding gear or epicyclic types, of the friction type, of a type permitting a progressive variation in the speed ratio or any other suitable mechanism of the same type.

In place of employing a clutch and a change-speed gear such as above referred to, a variable-speed mechanism of the type disclosed in my co-pending application Serial No. 695,898 may be utilized.

A preferred embodiment of the invention will be described hereafter by way of example only, but it will be understood that modifications are made according to the nature of the clutch or variable-speed mechanism utilized.

In the accompanying drawing:—

Fig. 1 is a diagrammatic plan view in partial section of a transmission driven by an internal combustion engine according to the invention.

Fig. 2 illustrates a modified detail of the apparatus in partial section, and Fig. 3 is a sectional plan view of a gear box and a hydraulic clutch forming a combination suitable for incorporation in a transmission system according to the invention.

Referring to Fig. 1, 1 indicates an internal combustion engine of any suitable type and provided with any desired number of cylinders, four being indicated in dotted lines, by way of example only. Associated with the said engine is a supercharger 2, which draws a supply of atomized fuel mixture from a carburettor 3 and delivers it to the induction pipe of the engine under pressure. The supercharger 2 may be of any desired type such as a Rootes blower, a fan, or a compressor. It has not been thought necessary to show any details of this supercharger as the construction thereof follows normal practice. The said supercharger is driven by the shaft 4 operated through the mechanism to be described hereinafter.

The crank shaft 5, of the engine 1, is continued through suitable coupling shafts to a gear box 6 or other variable speed transmission mechanism. As stated above, this gear box may be of the sliding gear type, in which the gear changes are performed in steps by suitable control mechanism operated either manually or automatically, or it may be of the progressively varying type operated through frictionally engaged surfaces, or it may be of the type disclosed in my co-pending application Serial No. 695,898.

If desired, a clutch such as a friction clutch or a hydraulic clutch of any suitable type may be incorporated, either in the fly-wheel 6a in accordance with normal practice or associated with the gear box 6.

The shaft 4 of the supercharger is adapted to be driven, in the embodiment shown on the drawing, differentially from driving connections on the two sides of the gear box 6. Thus as shown, chain wheels 7 and 8 are mounted respectively on the input and output shafts of the gear box 6 and the said wheels operate by means of suitable chains, further chain wheels 9 and 10, connected to an epicyclic gear box indicated generally at 11, arranged to drive the supercharger shaft 4 at a speed which increases when the difference between the speeds of rotation of the wheels 7 and 8 is greater.

As shown, the chain wheel 10 is connected to the outer ring of the epicyclic mechanism, while the chain wheel 9 is connected to a cage 12 carrying the epicyclic wheels 13. The latter engage with a sun wheel 14 mounted on the shaft 4.

By suitably proportioning the number of teeth on the chain wheels 7, 8, 9 and 10 and the proportions of the epicyclic mechanism 11, the following results can be obtained.

(A) When the output shaft is stationary or rotating at a low speed and the engine shaft 5 is rotated, the shaft 4 can be driven at a relatively high speed permitting the engine power to be increased under these conditions and facilitating acceleration and hill climbing.

(B) As the speed of the output shaft increases, the shaft 4 is slowed down so that a smaller degree of supercharge is applied to the incoming fuel-air mixture.

In Fig. 2 in place of using an epicyclic gear having an outer ring, a cage and a sun wheel, bevel wheels are employed mounted on radial axes in a casing or box 15 driven by the chain wheel 10, while the other chain wheel 9 drives a crown wheel 16 meshing with the aforesaid bevel wheels. The shaft 4 is fixed to a further crown wheel 17, also in engagement with the said bevel wheels.

It will readily be understood that by virtue of this arrangement, substantially similar results are obtained as described with reference to Fig. 1.

In place of using chain wheels 7, 8, 9 and 10 and co-operating drive chains between them, other equivalent mechanical connections can of course be employed, such as spur gears or friction belts.

Although as shown the supercharger 2 is adapted to deliver fuel-air mixture to the engine, it might be desirable to modify the arrangement so that only air is compressed in the supercharger and is then delivered to a carburetting device, by which the fuel mixture is produced and delivered to the engine. Moreover, of course in the case of compression ignition engines, no carburettor equivalent to 3 would be utilized.

It should also be understood that the gear ratio of the epicyclic mechanism 11, as well as the number of teeth on the chain wheels 7, 8, 9 and 10 will be varied according to the speed at which it is desired to drive the supercharger under the various conditions of operation.

The invention is not limited to the precise forms or details of construction described, as these may be varied to suit particular cases.

What I claim and desire to secure by Letters Patent of the United States of America is:—

1. A power transmission system for driving an output shaft by an internal combustion engine comprising a variable-speed gear of the progressively varying type interposed between the engine and the output shaft, an epicyclic gear device, having three moving parts, connections on the two sides of said variable-speed gear connected to two parts of said epicyclic device, a supercharger and means connecting the third part of said epicyclic gear to the supercharger so that the latter is operated at a speed dependent on the speed difference of the engine and output shaft.

2. A power transmission system for driving an output shaft by an internal combustion engine comprising a supercharger for delivering a compressed fuel-air mixture charge to the engine, change-speed mechanism connecting said engine to said output shaft, means connecting the said output shaft to an adjacently placed outer ring, a connection between the engine shaft and a cage carrying epicyclic wheels meshing with said ring and a sun wheel in driving engagement with said epicyclic wheels, said sun wheel being mounted on a shaft operating the supercharger.

3. A power transmission system according to claim 2, wherein a clutch is employed instead of the change-speed gear.

4. A power transmission system for driving an output shaft by an internal combustion engine comprising a supercharger for delivering a compressed charge of fuel-air mixture to the engine and progressively varying, automatically operated gear mechanism between the engine and the output shaft, a chain and chain wheel connection between the output shaft and an adjacently positioned outer ring of an epicyclic gear train, a chain and chain wheel connection between the engine shaft and a cage, said cage carrying epicyclic wheels in engagement with said outer ring and a sun wheel in driving engagement with said epicyclic wheels, said sun wheel being mounted on the shaft of the supercharger.

5. A power transmission system for driving an output shaft by an internal combustion engine comprising a supercharger for delivering a compressed charge of fuel-air mixture to the engine, a variable-speed gear between the engine and the output shaft and mechanism for driving said supercharger at a rate depending on the speed difference between the engine and the output shaft, said means comprising a housing in driving connection with the output shaft and disposed adjacent the latter and embodying on its inner surface bevel wheels disposed on radial axes, a crown wheel in driving engagement with the engine shaft, said crown wheel meshing with said bevel wheels and a further crown wheel meshing with said bevel wheels and mounted on a shaft connected to the supercharger.

6. A power transmission system for driving an output shaft by an internal combustion engine comprising a supercharger for delivering a compressed charge to the engine, a controllably variable ratio transmission mechanism between the engine and the output shaft and means for driving a supercharger at a speed depending on the difference in speeds between the engine and the output shaft as determined by said transmission mechanism, said latter means including an outer ring in driving connection with the output shaft, said ring being toothed on its inner face, planet wheels meshing with said toothed ring, a cage carrying said planet wheels, said cage being in rotary driving engagement with the engine shaft and a sun wheel meshing with said planet wheels, said sun wheel being mounted on a shaft operating the supercharger.

7. A power transmission system for driving an output shaft by an internal combustion engine comprising a supercharger for delivering a compressed charge to the engine, a clutch, a controllably variable ratio transmission mechanism located between the clutch and the output shaft, a shaft connected to said supercharger and differential means for driving said latter shaft at a speed determined by the ratio of said transmission mechanism, the said differential means including an epicyclic train having the outer ring in driving engagement with the output shaft, epicyclic planet wheels in driving engagement with said ring, a cage carrying said epicyclic wheels and in driving engagement with the engine shaft and a sun wheel mounted on the supercharger shaft and in driving engagement with the said planet wheels.

8. A power unit comprising an internal combustion engine, a change speed gear driven by the engine shaft and operating an output shaft, a supercharger and means driven simultaneously and differentially by the engine shaft and by the output shaft for operating the supercharger.

9. A power unit comprising an internal combustion engine having an output shaft, a change-speed gear operated by said output shaft and in turn operating a driven shaft at given gear ratios, a supercharger for the engine, a differential device for operating said supercharger and driving connections between said output shaft and one member of the differential device and between said driven shaft and another member of the differential device.

FRANCIS THOS. FAWCETT.